(12) United States Patent
Siegfriedsen

(10) Patent No.: US 7,579,706 B2
(45) Date of Patent: Aug. 25, 2009

(54) WIND ENERGY SYSTEM WITH A FULLY INTEGRATED MACHINE ASSEMBLY

(76) Inventor: Sonke Siegfriedsen, Dahmweg 2, D-25878, Drage (DE) 25878

( * ) Notice: Subject to any disclaimer, the term of this patent is extended or adjusted under 35 U.S.C. 154(b) by 268 days.

(21) Appl. No.: 11/621,227

(22) Filed: Jan. 9, 2007

(65) Prior Publication Data
US 2007/0108776 A1 May 17, 2007

Related U.S. Application Data

(63) Continuation-in-part of application No. PCT/DE2005/001552, filed on Sep. 6, 2005.

(30) Foreign Application Priority Data
Sep. 24, 2004 (DE) ............. 10 2004 046 563

(51) Int. Cl.
*F03D 9/00* (2006.01)
(52) U.S. Cl. ............................ 290/55; 290/44
(58) Field of Classification Search ............ 290/44, 290/55; 416/132 B; 60/398; 415/4.2, 2.1
See application file for complete search history.

(56) References Cited

U.S. PATENT DOCUMENTS

| | | | | |
|---|---|---|---|---|
| 2,653,250 A | * | 9/1953 | Romani | 290/4 C |
| 4,423,333 A | * | 12/1983 | Rossman | 290/44 |
| 4,427,897 A | * | 1/1984 | Migliori | 290/44 |
| 4,431,375 A | | 2/1984 | Carter, Jr. et al. | |
| 4,757,211 A | * | 7/1988 | Kristensen | 290/55 |
| 4,966,525 A | * | 10/1990 | Nielsen | 416/9 |
| 6,420,808 B1 | * | 7/2002 | Hosle | 310/83 |
| 6,483,199 B2 | * | 11/2002 | Umemoto et al. | 290/55 |
| 7,075,192 B2 | * | 7/2006 | Bywaters et al. | 290/55 |
| 7,436,083 B2 | * | 10/2008 | Shibata et al. | 290/44 |
| 7,498,683 B2 | * | 3/2009 | Landwehr | 290/43 |
| 2003/0002976 A1 | * | 1/2003 | Dial | 415/90 |
| 2004/0041409 A1 | * | 3/2004 | Gabrys | 290/55 |
| 2004/0247437 A1 | * | 12/2004 | Otaki et al. | 416/132 B |

FOREIGN PATENT DOCUMENTS

JP 8-284846 A * 10/1996
JP 2002221263 8/2002

* cited by examiner

*Primary Examiner*—Julio C. Gonzalez
(74) *Attorney, Agent, or Firm*—Larson and Larson PA; Frank Liebenow

(57) ABSTRACT

A wind energy system comprising a tower, a machine housing which is rotatably arranged on the tower about its axis, receiving a gear mechanism, a generator, a slip ring arrangement, a brake, and a rotor which is mounted in the machine housing and which is provided with at least one rotor blade, wherein the gear mechanism, generator, vertical bearing arrangement, slip ring transmission element and rotor bearing are integrated in the machine housing.

9 Claims, 3 Drawing Sheets

WIND ENERGY SYSTEM WITH A FULLY INTEGRATED MACHINE ASSEMBLY

PRIOR APPLICATIONS

This application is a continuation-in-part of International Application No. PCT/DE2005/001552, filed on Sep. 6, 2005, which in turn bases priority on German Application No. 10 2004 046 536.0, filed on Sep. 24, 2004.

BACKGROUND OF THE INVENTION

1. Field of Invention

The invention relates to a wind energy system having a tower, a machine housing located on the tower so as to rotate about its axis and receiving a gear mechanism, a generator, a slip ring arrangement and a brake, and a rotor mounted in the machine housing having at least one rotor blade.

2. Description of the Prior Art

Over the last few decades, wind power technology has dynamically further developed, but this only relates in average to very large installations for main parallel operations. However, there have been no advances over the past twenty years in the development of small plant systems in the kilowatt range. Therefore, these plants are still very expensive and have consequently not appeared on the market. The use of wind power could play an important part in supplying two billion people having no access to electricity. For this purpose, there is a considerable need for plants in the power range of 1 to 10 kW, but this is only possible if the plants are extremely robust and inexpensive, easy to erect and largely maintenance-free.

Existing small plants are unable to fulfill these demands because they are too expensive and/or too fault-prone. A major problem is to design the individual components required so as to be matched to one another in optimum manner, and which can be joined together appropriately. A reliable plant can only be developed on satisfying this requirement. It is also of decisive importance to be able to manufacture all the components inexpensively using CNC machines and enabling easy, rapid installation. In order to permit an easy erection, it is very advantageous if the plant has a limited head weight.

Most of the presently commercially available small plants are constructed from individual standard components which are screwed to a machine frame. This leads to relatively large subassemblies, which are, therefore, usually very heavy. These components are not matched to the specific needs of wind power utilization so they do not meet the requirements regarding service life and loading. It is common to all of these solutions that they have a considerable head weight, are expensive, and also fault-prone, so that they are unsuitable for more widespread use.

As prior art, particular reference is made to the 1954 German patent 890 480, which discloses a plant construction which is in part integrated, but which has too many components to be screwed together.

Therefore, the problem of the invention is to provide a wind energy system of the aforementioned type in which all the components are matched to one another in optimum manner, and all parts can be compactly joined together so as to provide a lightweight and, in particular, inexpensive machine set or unit.

SUMMARY OF THE INVENTION

According to the invention, this problem is solved by the implementation of a fully integrated machine assembly with all the components being compactly combined in a cast part. These components consist of the vertical mounting, slip ring transmission member, gear mechanism, generator, brake and rotor bearing. All the parts are geometrically arranged in such a way for providing a compact and lightweight machine housing. It is particularly advantageous if the machine housing is manufactured as an aluminum cast part.

BRIEF DESCRIPTION OF THE DRAWINGS

Further features and advantages of the present invention can be gathered from the following descriptions of the preferred embodiment with reference to the attached drawings, wherein.

DETAILED DESCRIPTION OF THE PREFERRED EMBODIMENT

Figure 1:
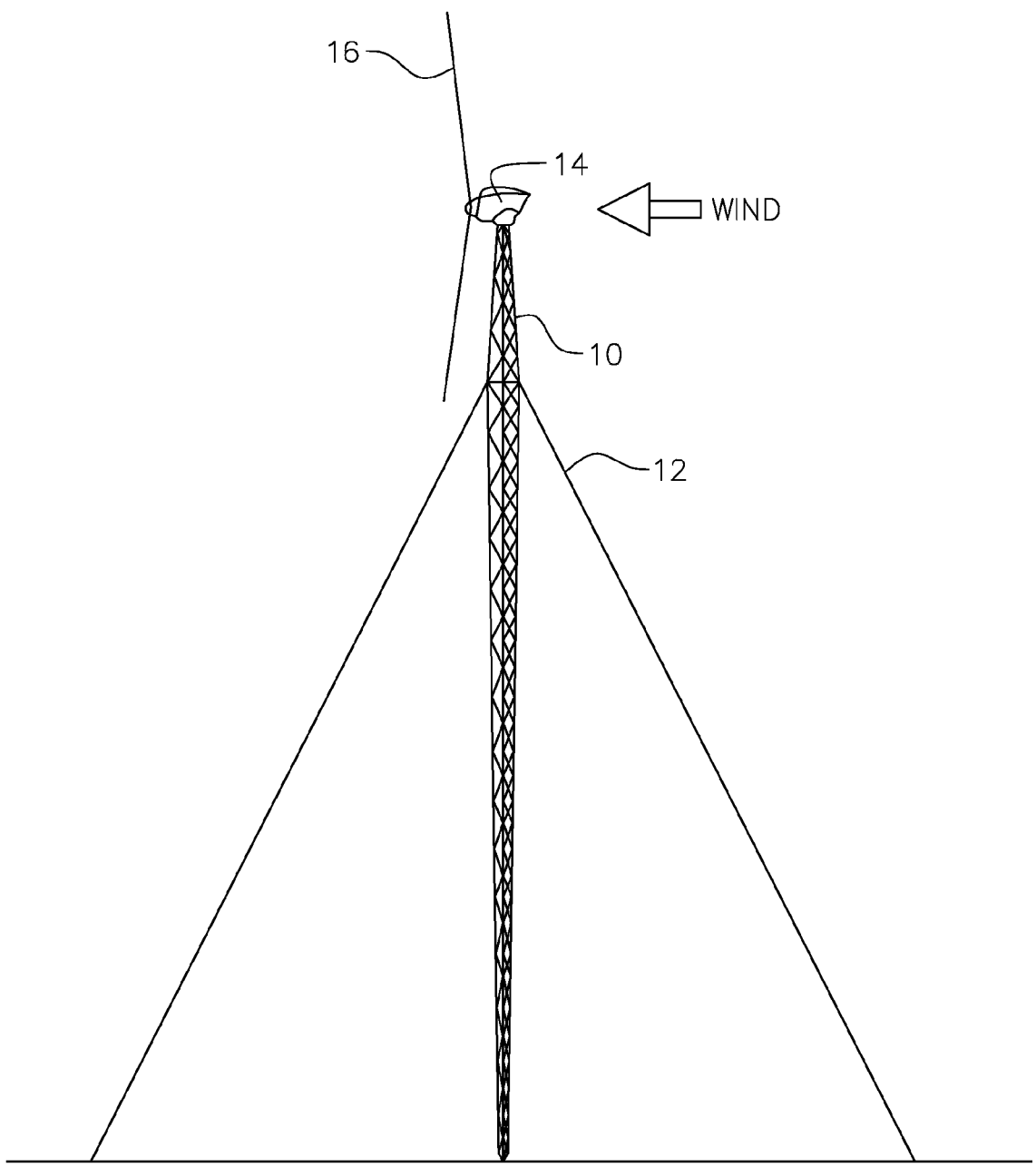
FIG. 1 shows the complete wind energy system with a tower, gondola and rotor, in which the wind direction is indicated by an arrow.

FIG. 1 shows the wind energy system with tower 10 and tower anchoring 12. The gondola 14 is placed on the tower 10 so as to rotate about its axis. The gondola 14 houses the rotor 16 rotating on the leeside, i.e. the side of tower 10 remote from the wind.

Figure 2:
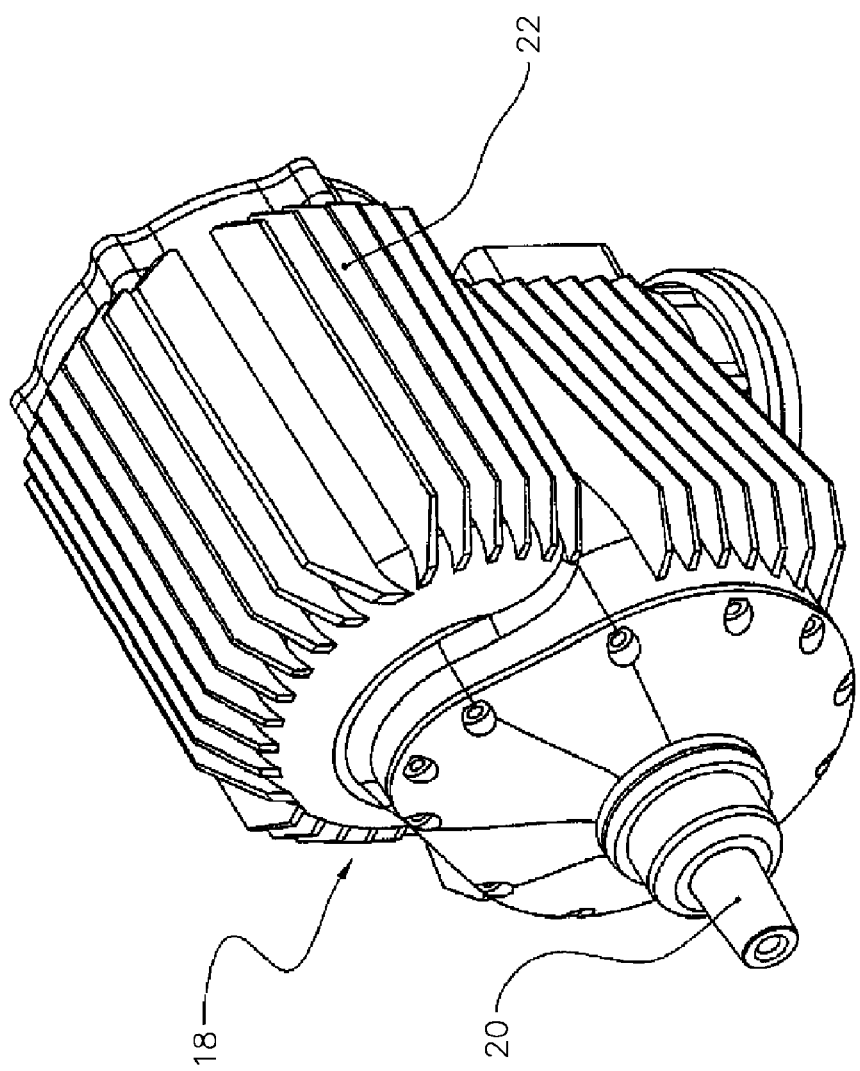
FIG. 2 shows a perspective view of the machine assembly of the wind energy system.

FIG. 2 shows a perspective view of the machine housing 18, in which the rotor shaft 20 can be seen on the front, and cooling fins 22 are located on the sides of the machine housing 18.

Figure 3:
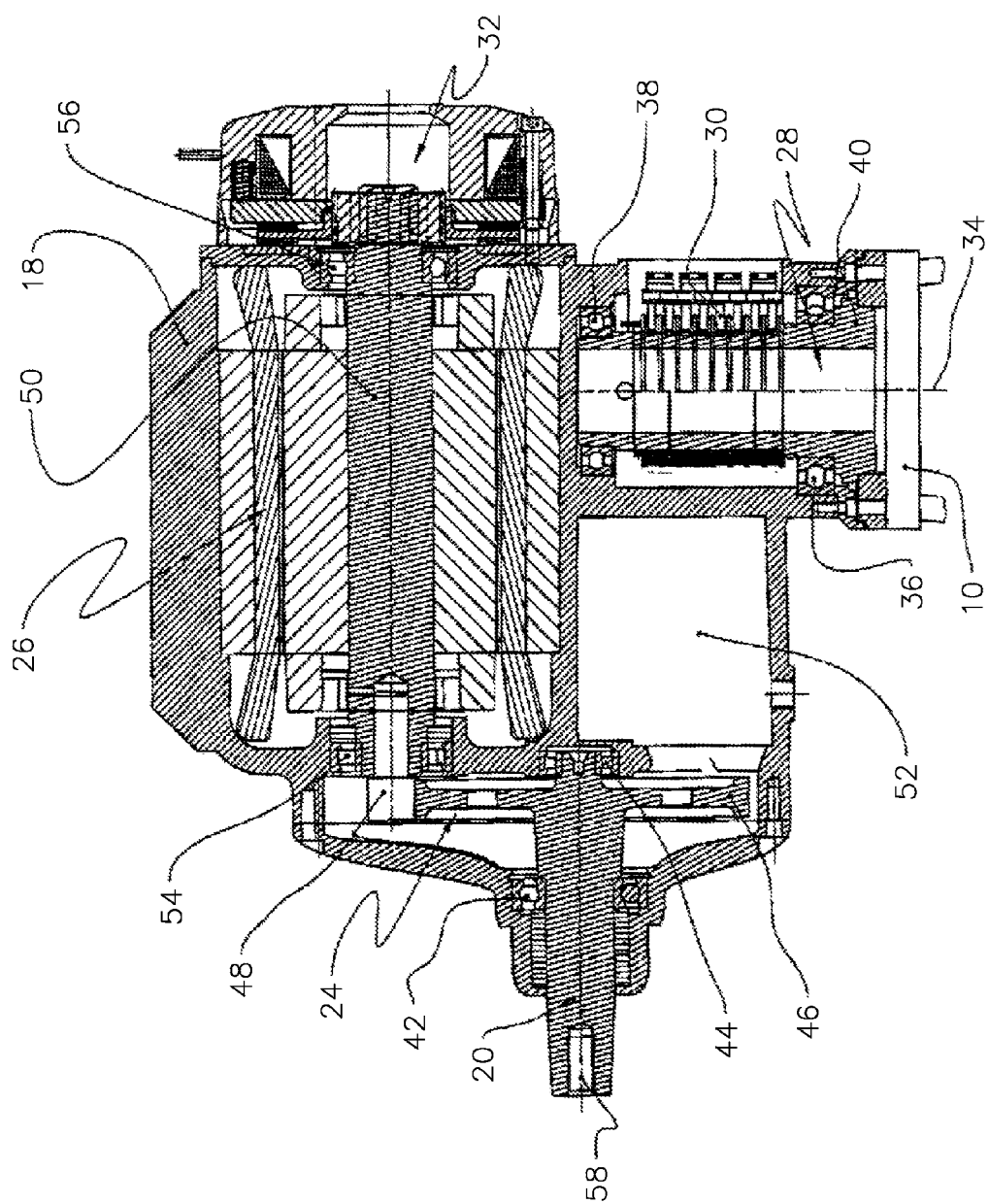
FIG. 3 shows a sectional view of the machine assembly of FIG. 2 of the wind energy system.

FIG. 3 shows the machine housing 18 in the form of a sectional drawing. The machine housing 18 receives a gear mechanism 24, generator 26, vertical bearing 28, slip ring transmission member 30 and brake 32. The machine housing is constructed as a cast part and has a plurality of bearing seats for receiving the necessary bearings.

Referring still to FIG. 3, to permit the following of the gondola 14 in the case of wind direction changes, the machine assembly must be mounted so as to rotate about the tower longitudinal axis 34. This takes place by means of a lower bearing 36 and an upper bearing 38, which are mounted on the journal 40 screwed to the tower 10. For transmitting the electric power from generator 26 to a cable fixed to the tower 10, a slip ring transmission member 30 is required and is placed between bearings 36 and 38 on journal 40.

Rotor shaft 20 is mounted in rotary manner in machine housing 18 by means of a front bearing 42 and a rear bearing 44. Rotor shaft 20 carries rotor 16 (shown in FIG. 1), and the gear wheel 46. In this embodiment, the gear mechanism 24 is constructed as a single-stage spur gear, the gear wheel 46 meshing with the gear pinion 48. The gear pinion 48 is firmly joined to the generator shaft 50, and consequently drives the generator 26. For supplying the gear mechanism 24 with lubricant, the gear wheel 46 runs in an oil pan 52 constructed in the machine housing 18.

Generator shaft 50 is mounted by means of a front bearing 54 and a rear bearing 56. Front bearing 54 is pressed into machine housing 18 and the rear bearing 56 into brake 32. Front bearing 54 is lubricated with the lubricant of gear mechanism 24, and the rear bearing 56 with a separate grease filling. Brake 32 with rear bearing 56 is screwed to the machine housing 18, and consequently seals the generator area 26 against environmental affects.

This construction permits an extremely compact, lightweight design of the entire machine assembly. The gear mechanism 24 is located as close as possible to vertical bearing 28, and the generator 26 is positioned above oil pan 52 and vertical bearing 28. As a result, the machine housing 18 has a particularly short construction length. In the form of a casting, which can be completely machined on a CNC machining center in one setting, the machine housing 18 can be very inexpensively manufactured. It is advantageous if the rotor axis 58 is at right angles to the tower axis 34. The machine housing has a particularly low weight if an aluminum alloy is used as the material. In addition, the parts are reduced to a minimum, which has a positive effect on costs and also the reliability of the system.

The wind energy system in which the machine housing 18 is in the form of a block in casting form with an outer ring of a lower first bearing 36 serving for the lower mounting of a journal 40 screwed to the top of the tower 10 and an outer ring of an upper second bearing 38 for the upper mounting of journal 40, an outer ring of a third bearing 42 for mounting the front of rotor shaft 20 with an outer ring of a fourth bearing 44 for mounting the rear of rotor shaft 20 carrying the gear wheel 46 and inserted in the machine housing 18, an outer ring of a fifth bearing 54 for mounting the front end of generator shaft 50 and an outer ring of a sixth bearing 56 for mounting the rear end of generator shaft 50, has a reduced weight which makes the total expenditure for the erection of the wind energy system including the tower, much lower.

It is also proposed that the gear pinion 48 of gear mechanism 24 is pressed into the generator shaft 50, and the slip ring transmission member 30 is mounted on journal 40.

The brake 32, in the form of a centrifugal brake resting on the free end of the generator shaft 50 and whose abutment is firmly connected to the machine housing block 18 or in the form of an electrically released disk brake placed on the generator shaft 50 surrounding the fifth bearing 54, reduces the otherwise necessary apparatus expenditure, particularly in those cases where the at least one rotor blade is not adjustable.

The invention claimed is:

1. A wind energy system having:
   a tower,
   a machine housing placed on the tower so as to rotate about an axis of said tower,
   the machine housing having a gear mechanism, a generator, a horizontal bearing, a slip ring arrangement, a brake, a rotor shaft front bearing, a rotor shaft rear bearing, a generator shaft front bearing, an oil pan and a generator shaft rear bearing integrated within said machine housing,
   the gear mechanism having a gear wheel, the gear wheel transferring lubricant from the oil pan to the gear mechanism and the generator front bearing;
   a rotor shaft, a first end of the rotor shaft extending vertically through the machine housing, a second end of the rotor shaft interfaced with the gear mechanism, and the rotor shaft rotatably supported by the rotor shaft front bearing and the rotor shaft rear bearing;
   a rotor mounted on the first end of the rotor shaft, the rotor having at least one rotor blade;
   the generator positioned above an oil pan, the generator having a generator shaft, a front end of the generator shaft interfaced with the gear mechanism and the brake seated on a rear end of the generator shaft, an abutment of the brake is firmly connected to the machine housing;
   wherein the machine housing is a cast part with a plurality of bearing seats and the rotor shaft front bearing, the rotor shaft rear bearing, the generator shaft front bearing, and the generator shaft rear bearing are seated in the machine housing.

2. The wind energy system of claim 1, wherein the machine housing is formed of cast iron.

3. The wind energy system of claim 2, wherein an aluminum alloy is employed to form the cast part for the machine housing.

4. The wind energy system of claim 1, wherein the gear mechanism comprises a single-stage spur gear.

5. The wind energy system of claim 1, wherein the generator in said machine housing is positioned in said vertical bearing.

6. The wind energy system of claim 1, further comprising a rotor axis of the rotor, said rotor axis positioned at a right angle to said tower axis.

7. The wind energy system of claim 1, wherein the rotor is positioned on a leeside of said tower relative to said tower axis.

8. The wind energy system of claim 1, further comprising a gear shaft generator bearing integrated into said brake and firmly connected to the housing.

9. The wind energy system of claim 1, further comprising a plurality of cooling fins externally equipped to said machine housing.

* * * * *